United States Patent
Hayashi et al.

(10) Patent No.: US 7,289,459 B2
(45) Date of Patent: Oct. 30, 2007

(54) RADIO COMMUNICATION SYSTEM WITH ADAPTIVE INTERLEAVER

(75) Inventors: Hiroshi Hayashi, Tokyo (JP); Tetsu Ikeda, Kanagawa (JP); Mohsin Mollah, Chiba (JP)

(73) Assignee: Motorola Inc., Schaumburg, IL (US)

( * ) Notice: Subject to any disclaimer, the term of this patent is extended or adjusted under 35 U.S.C. 154(b) by 1188 days.

(21) Appl. No.: 10/213,902

(22) Filed: Aug. 7, 2002

(65) Prior Publication Data

US 2004/0028004 A1    Feb. 12, 2004

(51) Int. Cl.
*H04B 7/216* (2006.01)
(52) U.S. Cl. .................................. 370/320; 370/210
(58) Field of Classification Search .............. None
See application file for complete search history.

(56) References Cited

U.S. PATENT DOCUMENTS

| | | | |
|---|---|---|---|
| 5,940,439 A | 8/1999 | Kleider et al. | |
| 6,061,386 A * | 5/2000 | Molev-Shteiman | 375/140 |
| 6,198,748 B1 | 3/2001 | Bruckert | |
| 6,272,123 B1 | 8/2001 | Abe | |
| 6,289,217 B1 | 9/2001 | Hamalamen et al. | |
| 6,304,581 B1 | 10/2001 | Chen et al. | |
| 6,393,394 B1 | 5/2002 | Ananthapadmanabhan et al. | |

OTHER PUBLICATIONS

Gui et al, A Novel Chip-Interleaving DSS SS System, IEEE, pp. 21-27, 2000.*
Zhou et al, Chip-Interleaved Block-Spread Code Division Multiple Access, IEEE, pp. 235-248, 2002.*
Jean-Paul M. G. Linnartz, Senior Member, IEEE, "Performance Analysis of Synchronous MC-CDMA in Mobile Rayleigh Channel with Both Delay and Doppler Spreads", IEEE Transactions on Vehicular Technology, vol. 50, No. 6, Nov. 2001, 13 pages.

* cited by examiner

*Primary Examiner*—Frank Duong
(74) *Attorney, Agent, or Firm*—Randall S. Vaas

(57) ABSTRACT

A radio communication system with adaptive interleaving selects between chip interleaving and bit interleaving depending upon the number of active code signals. A transmitted RF signal includes a coded information signal part and a control signal part that indicates a number of active code signals that have been combined to form the coded information signal part. The system is especially suited for MC-CDMA systems.

23 Claims, 4 Drawing Sheets

RADIO COMMUNICATION SYSTEM WITH ADAPTIVE INTERLEAVER

BACKGROUND OF THE INVENTION

The present invention relates generally to communication systems and to adapting a radio connection to the amount of data to be transmitted and to the prevailing radio traffic environment, and more particularly, to communication systems that can perform different types of interleaving depending on various conditions.

Second-generation cellular radio systems, such as D-AMPS (Digital Advanced Mobile Phone Service), GSM (Global System for Mobile telecommunications) and PDC (Personal Digital Cellular), are mainly meant for transmitting voice data using telephone connections that all have the same data transmission rate. The required data transmission rate can vary largely between the different connections, and it may even change during the communication. Moreover, the interference that invariably occurs in the radio connection may require coding on different levels in order to transmit the information carried in the connection to the receiver in a feasible form. Further, there has been an increasing demand for wireless networks to accommodate various types of traffic, such as voice, data, and video information, which requires various or increased data transmission rates.

There are presently two prevalent systems for wireless communications, TDMA and CDMA. In systems based on TDMA (Time Division Multiple Access), a given time slot is allocated for the use of each single connection, the time slot being part of a cyclically repeated frame structure at a given carrier wave frequency. In systems based on CDMA (Code Division Multiple Access), the corresponding basic unit allocated for the use of a connection is a given division code within a given carrier wave frequency. Current wireless systems are limited to data speeds around 1 Mbits/sec. The main limitation is inter-symbol interference due to multipath and frequency selective fading. OFDM (Orthognal Frequency Division Multiplexing) overcomes this limitation. In OFDM, a high-speed serial data stream is converted to many low speed parallel streams. The low speed parallel streams are then transmitted simultaneously using many subcarriers. Since the data rate of each parallel stream is much lower, the bandwidth of each subcarrier is generally smaller than the coherent bandwidth, which can eliminate inter-symbol interference caused by linear distortion. In addition, the spectra of the OFDM subcarriers overlap each other with minimum separation. Thus, OFDM can achieve high speed and high spectrum efficiency.

A version of CDMA based on OFDM, for use in fourth-generation cell phones, known as multicarrier CDMA (MC-CDMA), is currently being developed. MC-CDMA transfers a given symbol over multiple orthogonal subcarriers. Yet another version of CDMA based on OFDM is known as multicarrier/direct spread (MC/DS) CDMA, which uses multiple subcarriers, which have been directly spread processed.

The goal of any communication system is the error free transmission of the communicated signal whether it be an analog signal, a coded analog signal, or coded data. Communication systems adapted for transmission of coded information (voice and/or data) generally include some form of error correction. Error correction in these systems frequently takes the form of error detection and correction software. That is, software adapted to detect errors in the coded information and based upon a set of correction parameters, replace the errors with an estimation of the correct coded information. These and other types of error correction mechanisms typically rely on prediction, interpolation and other similar techniques that generate an estimation of the corrupted coded information from preceding and succeeding bits of coded information.

In wireless communication systems, such as the types discussed above, bursty errors, due, for example, to fading, interference or other disruptions to the coded information as it is transmitted over the air interface, may cause errors in blocks of bits. Errors in blocks of bits are difficult to correct using error correcting code because of the lack of surrounding information from which to estimate the correct information. A solution is to provide as much diversity in the air interface as possible to achieve acceptable levels of communication quality in terms of data error rate. A common technique for introducing diversity into the air interface is interleaving the bits of coded information over many transmitted frames. Interleaving, in addition to error correction, works very well especially where fading is experienced by scattering the errors that would otherwise wipe out an entire frame of coded information among many frames.

Various kinds of interleaving are known, such as chip interleaving, bit interleaving and symbol interleaving. In chip interleaving, a symbol (bit of coded information) is distributed to non-adjacent subcarriers. Chip interleaving is performed after spreading in the transmitter and chip de-interleaving is performed before de-spreading in the receiver. In bit interleaving, the constituent bits of a modulated symbol are mapped onto different subcarriers instead of the same subcarrier. Bit interleaving is used to deter the attenuation of consecutive bits by randomizing the bit sequence before modulation. In symbol interleaving, symbols of an RF transmit frame are read into a matrix one way and read out for transmission in a different way. For example, the data is read into the matrix by rows and read out of the matrix by columns. The next frame is then read into the matrix and the process repeated. Symbol interleaving maintains the correlation between subcarriers within a symbol. This is the method specified by the IS-95 standard where 456 symbols of a 20 millisecond (ms) frame are interleaved prior to spreading of the signal.

For MC-CDMA, symbol interleaving can maintain orthogonality using correlation between adjacent subcarriers in a multipath environment with short delay spread. On the other hand, chip and bit interleaving can obtain high frequency diversity gain by distributing a symbol over an uncorrelated subcarrier. The optimum interleaving method depends on the level of inter-code interference, which depends upon the number of active codes. The number of active codes generally is related to the number of users. For instance, if each user uses only one code at a time, then the number of active codes is equal to the number of users. More particularly, symbol interleaving is advantageous when there are many active codes, while chip interleaving and bit interleaving are advantageous when there are fewer active codes.

It would be advantageous to be able to dynamically select a desirable interleaving method based on various network factors.

BRIEF DESCRIPTION OF THE DRAWINGS

The following detailed description of a preferred embodiment of the invention will be better understood when read in conjunction with the appended drawings. For the purpose of illustrating the invention, there is shown in the drawings an embodiment that is presently preferred. It should be understood, however, that the invention is not limited to the precise arrangement and instrumentalities shown. In the drawings.

DETAILED DESCRIPTION OF PREFERRED EMBODIMENTS

Figure 1:
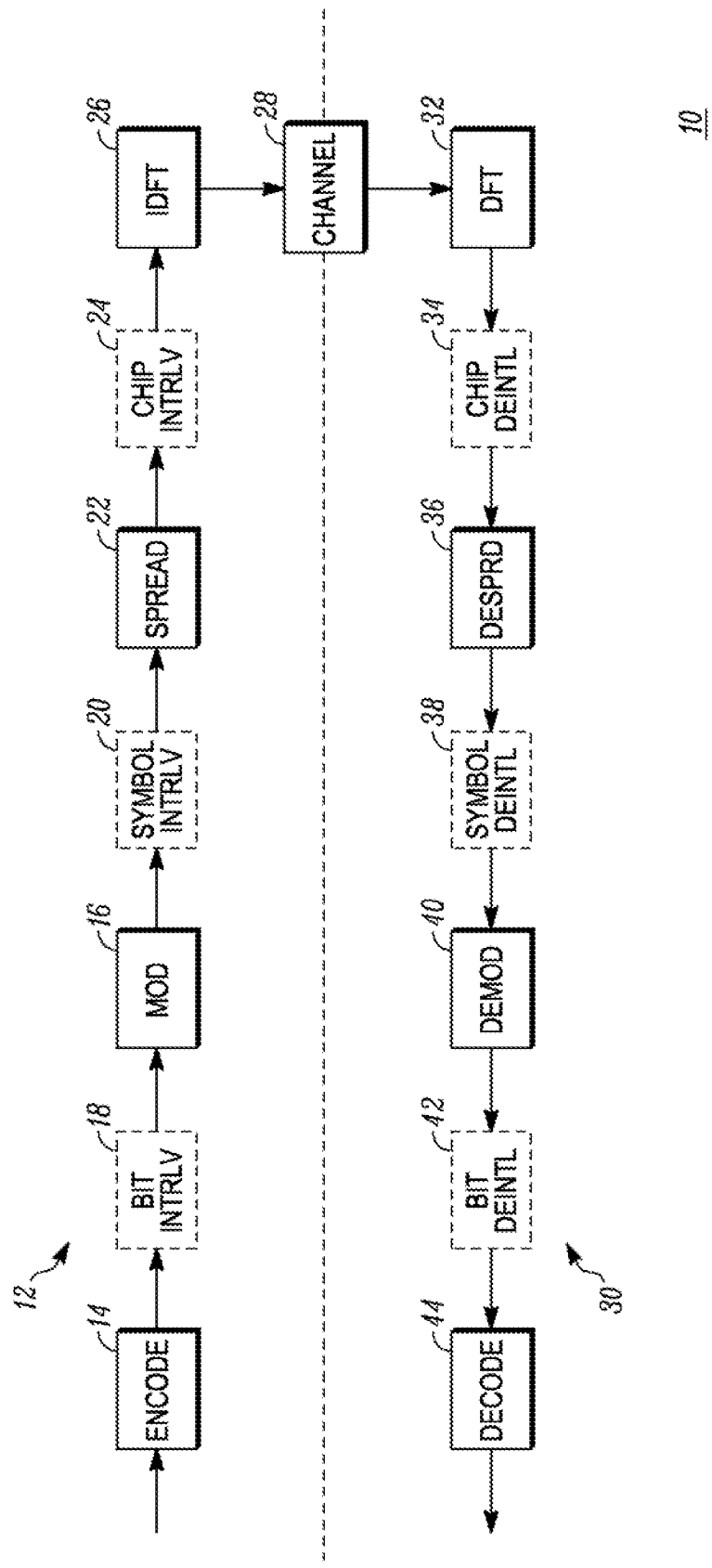
FIG. 1 is a schematic block diagram of a radio communication system that can perform various methods of interleaving.

The detailed description set forth below in connection with the appended drawings is intended as a description of the presently preferred embodiment of the invention, and is not intended to represent the only form in which the present invention may be practiced. It is to be understood that the same or equivalent functions may be accomplished by different embodiments that are intended to be encompassed within the spirit and scope of the invention. Further, although the invention is illustrated in a MC-CDMA system, it may be used in other systems, such as a MC/DS-CDMA system. In the drawings, like numerals are used to indicate like elements throughout.

In accordance with the present invention, a novel method and apparatus for a communication system with adaptive interleaving is shown. In one embodiment, the present invention provides a method of transmitting coded data information, including the steps of: receiving at least one active code signal and determining the number of received active code signals, encoding the received active code signal; bit interleaving the encoded signals if the number of active code signals is greater than or equal to a predetermined value; modulating a selected one of the bit interleaved signals and the encoded signals; spreading each of the modulated signals; combining the spread signals to form a composite signal; chip interleaving the composite signal if the number of active code signals is less than the predetermined value; processing a selected one of the composite signal and the chip interleaved signal; combining the processed signal with a control signal indicative of the number of active code signals to form an output signal; and transmitting the output signal.

In another embodiment, the invention provides a method of transmitting coded data information that selects between symbol interleaving and chip interleaving the signal, depending on the number of current active codes, as opposed to selecting between bit interleaving and chip interleaving.

In yet another embodiment, the present invention provides a method of processing an RF signal, including the steps of: receiving at least one RF signal and analyzing the signal to determine a coded information signal part and a control signal part; processing the coded information signal part by performing a DFT on it; performing chip de-interleaving on the processed signal to generate a chip-deinterleaved signal; de-spreading a selected one of the chip de-interleaved signal and the processed signal, wherein the selection is based on a value of the control signal part; demodulating the selected one of the chip de-interleaved signal and the processed signal; bit de-interleaving the demodulated signal; and decoding a selected one of the demodulated signal and the bit de-interleaved signal to generate an active code signal, wherein the selection is based on a value of the control signal.

In another embodiment, the present invention provides a method of processing an RF signal that selects between chip de-interleaving and symbol de-interleaving of the coded information part of the signal, depending upon a value of a control signal part of the signal.

In another embodiment, the present invention provides a transmitter for transmitting coded data information. The transmitter includes an encoder for encoding an active code signal to generate an encoded signal. A bit interleaver is connected to the encoder for performing bit interleaving on the encoded signal to generate a bit interleaved signal. A first selector is connected to the bit interleaver and the encoder for selecting one of the bit interleaved signal and the encoded signal. A modulator is connected to the first selector for receiving and modulating the selected one of the bit interleaved signal and the encoded signal. A spreader is connected to the modulator for spreading the modulated signal. A chip interleaver is connected to the spreader for performing chip interleaving on the spread signal to generate a chip interleaved signal. A second selector is connected to the chip interleaver and the spreader for selecting between one of the chip interleaved signal and the spread signal. A processor is connected to the second selector for processing the selected one of the chip interleaved signal and the spread signal, and a multiplexer is connected to the processor for combining the processed signal with a control signal indicative of a current number of active code signals to form an output signal.

In another embodiment, the present invention provides a receiver that receives and processes an RF signal. The receiver includes a demultiplexer for separating the RF signal into a coded information signal and a control signal. A processor is connected to the demultiplexer for receiving the coded information signal and performing a DFT on the coded information signal to generate a processed signal. A chip de-interleaver is connected to the processor for receiving the processed signal and performing chip de-interleaving on the processed signal to generate a chip-deinterleaved signal. A first selector is connected to the chip de-interleaver and the processor for selecting one of the chip de-interleaved signal and the processed signal. A de-spreader is connected to the first selector for receiving and de-spreading the selected signal. A demodulator is connected to the de-spreader for demodulating the de-spread signal. A bit de-interleaver is connected to the demodulator for bit de-interleaving the demodulated signal. A second selector is connected to the demodulator and the bit de-interleaver for selecting one of the demodulated signal and the bit de-interleaved signals, and a decoder is connected to the second selector for decoding the signal received from the second selector to generate an active code signal.

In another embodiment, the present invention provides an RF signal for use in a CDMA type communications system that includes a coded information signal part and a control signal part that indicates a number of active code signals that have been combined to form the coded information signal part.

Referring now to FIG. 1, a communication system 10 is shown. The system 10 includes two or more types of interleaving, including bit, symbol and chip interleaving. Although three types of interleaving are shown together in the drawing, the system 10 does not have to include all three types. The communication system 10 includes a transmitter 12 having an encoder 14 that receives a signal, such as a voice, data or video signal and encodes the signal. The encoder 14 is connected to a modulator 16 that modulates the encoded signal. If the system 10 includes a bit interleaver 18, then bit interleaving is performed on the encoded signal prior to modulating the signal. If the system 10 includes a symbol interleaver 20, then symbol interleaving may be performed on the modulated signal. The modulated signal is then spread over a predetermined frequency with a spreader 22. If the system 10 includes a chip interleaver 24, then chip interleaving may be performed on the spread signal. An IDFT function is then performed with an IDFT block 26 and the transformed signal is transmitted over a predetermined channel 28.

The system 10 further has a receiver 30 that receives the transmitted signal. Like the transmitter 12, the receiver 30 include may include various types of interleavers or de-interleaves to reverse the interleaving effected in the transmitter 12. More particularly, the receiver 30 includes a DFT block 32 that subjects the received signal to discrete Fourier transformation, a chip de-interleaver 34 for performing chip de-interleaving if chip interleaving was performed by the transmitter. A despreader 36 despreads the signal. The receiver 30 may also include a symbol de-interleaver 38, which reverses the symbol interleaving if such was performed by the transmitter 12. Next, the symbol is demodulated by a demodulator 40. The receiver 30 may also include a bit de-interleaver 42, which reverses the bit interleaving if such was performed by the transmitter 12. Finally, the demodulated and de-interleaved signal is decoded by a decoder 44, which reverses the encoding process performed on the original signal by the encoder 14, thereby regenerating the original signal. Each of the various components of the transmitter 12 and receiver 30 are known by those of ordinary skill in the art, and a detailed description thereof is not required for a complete understanding of the invention. The selection of the various interleaving methods is described in more detail below.

As previously discussed, chip, symbol and bit interleaving have pros and cons. The effects of the interleaving methods have been evaluated by comparing the block error rate (BLER) for each method. The parameters for the comparison are provided in TABLE 1. The comparison parameters are arranged two ways, with a fixed spreading factor (SF=32) and with a fixed number of multiplexed codes (Ncode=1). The influence of inter-code interference is observed by fixing the spreading factor and varying Ncode. The effect of diversity gain is observed by fixing the number of codes equal one and varying the spreading factor.

TABLE 1

| PARAMETERS | VALUE |
| --- | --- |
| Bandwidth | 80 MHz |
| Number of Subcarriers | 512 |
| Spreading Factor (SF) | 1-32 |
| No. of multiplexed codes | 1-32 |
| Modulation | QPSK/16 QAM/64 QAM |
| Channel Coding | Convolutional Coding (R = 1/2, K = 9) |
| Chip Combining | MMSE |
| Multipath Model | 24 path Triangle Decay |

Figure 2:
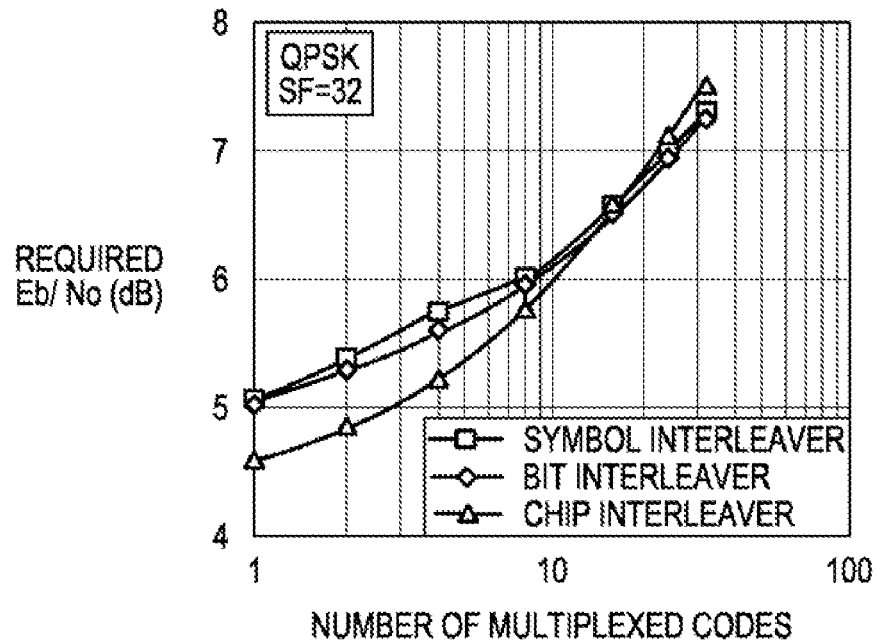
FIG. 2 is a graph comparing the various interleaving methods by showing Eb/No versus multiplexed codes.
Figure 3:
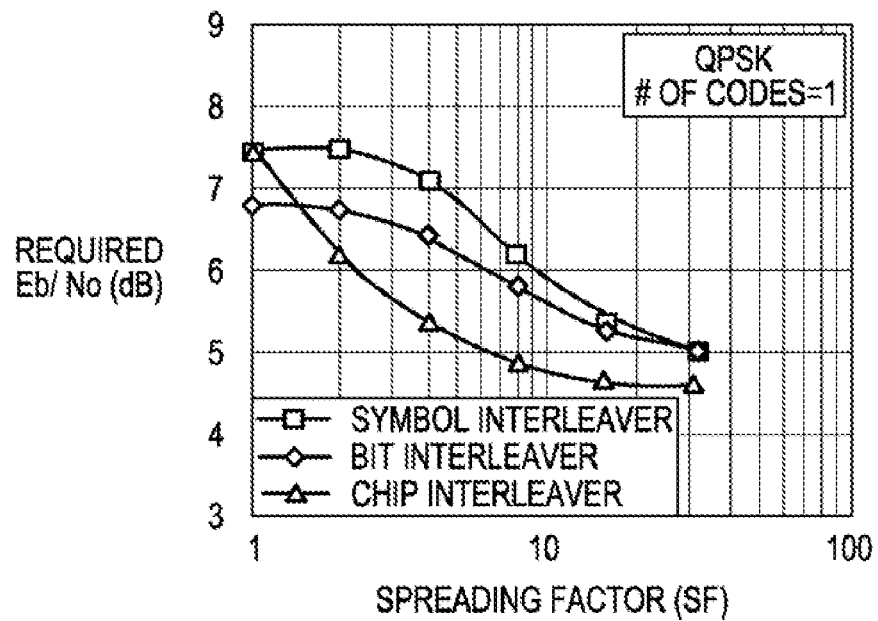
FIG. 3 is a graph comparing the various interleaving methods by shown Eb/No versus spreading factor.

Referring now to FIGS. 2 and 3, graphs illustrating $E_b/N_o$ versus multiplexed codes and Eb/No versus spreading factor for 1% BLER with SF=32 and Ncode=1 are shown. $E_b/N_o$ is a measure of the Signal to Noise Ratio for a digital communication system and is defined as the ratio of Energy per Bit ($E_b$) to the Spectral Noise Density ($N_o$). It is measured at the input to the receiver and is used as the basic measure of signal strength. In the graphs, symbol interleaving is indicated with a square, bit interleaving with a diamond, and chip interleaving with a triangle. From FIG. 2, it can be seen that chip interleaving is the best for a lower number of codes, but is the worst when the number of codes is large. Thus, chip interleaving provides the largest frequency diversity gain but distorts the orthogonality between codes. Under an inter-code interference free condition, chip interleaving performs better than symbol interleaving. However, when SF=1, chip and symbol interleaving provide the same performance, but bit interleaving provides improved performance because it separates the consecutive bit sequences, which can improve performance at the decoding stage. Symbol interleaving does not appear to provide the best performance under any conditions. Accordingly, chip interleaving is desirable when the number of multiplexed codes is small and the spreading factor is large, bit interleaving is desirable when the number of multiplexed codes is large, and symbol interleaving is not desirable at all. Thus, in one embodiment of the invention, a communication system is provided that dynamically selects between chip and bit interleaving depending on the current number of active codes.

Figure 4:
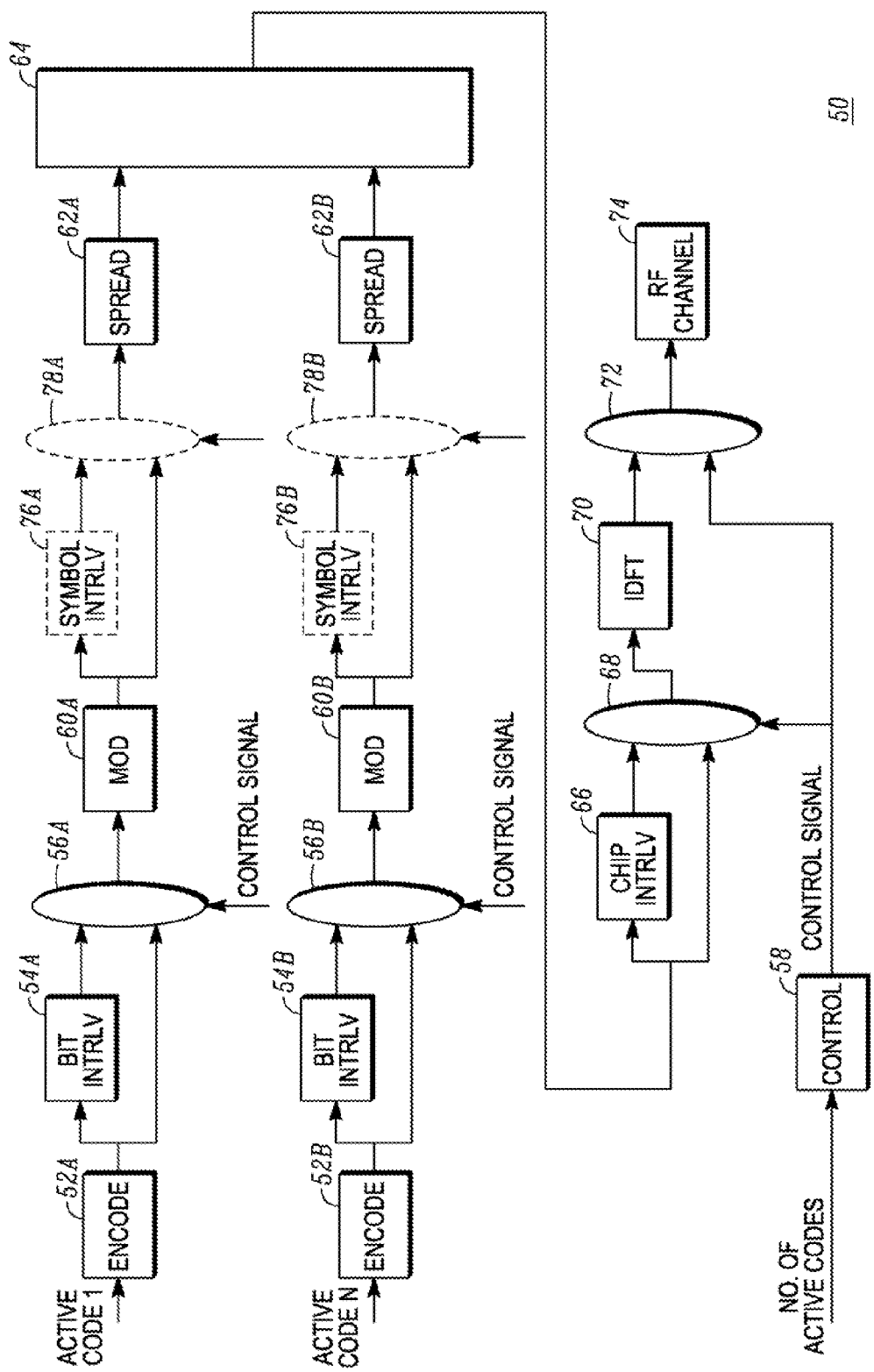
FIG. 4 is a schematic block diagram of a transmitter of a radio communication system in accordance with an embodiment of the present invention.

Referring now to FIG. 4, a schematic block diagram of a transmitter 50 of a communications system, such as MC-CDMA system, in accordance with the present invention is shown. The transmitter 50 receives one or more active code signals, two of which are shown. The active code signals may be coded voice data, graphics data, video data, or other coded information, i.e., packet data. For example, analog voice signals received from a microphone (not shown) of a handset are provided as an input to an analog to digital (A/D) converter (not shown) that converts the analog signal to digital form and the digital signal is provided to a digital vocoder (not shown) where it is encoded. The vocoder output is provided to an encoder 52a for encoding the active code signal to generate an encoded signal. The encoder 52a preferably includes Forward Error Correction (FEC), and is of a type known to those of ordinary skill in the art. A bit interleaver 54a is connected to the encoder 52a for performing bit interleaving on the encoded signal to generate a bit interleaved signal.

A first selector 56a is connected to the bit interleaver 54a and the encoder 52a for selecting one of the bit interleaved signal and the encoded signal. The first selector 56a is controlled by a control signal received from a control section 58. The control section 58 receives a signal that indicates the number of active codes being processed and generates the control signal therefrom. As discussed above, bit interleaving is desirable when the number of active codes is large. In accordance with the present invention, if the number of active codes is greater than a predetermined value, then the first selector 56a selects the input from the bit interleaver 54a and if the number of active codes is less than or equal to the predetermined value, the control signal causes the first selector 56a to select the signal from the encoder 52a. In the presently preferred embodiment, the predetermined value is about half of the maximum possible number of codes or spreading factor. However, as will be understood, this value may vary somewhat based on system conditions, and thus, half of the spreading factor is not to be taken as an absolute.

A modulator 60a is connected to the first selector 56a for receiving and modulating the selected one of the bit interleaved signal and the encoded signal. A spreader 62a is connected to the modulator 60a for spreading the modulated signal. As with the other component parts, the modulator 60a and the spreader 62a are known to those of skill in the art.

The transmitter 50, as will be understood by those of skill in the art, is able to process many active codes simultaneously or substantially simultaneously, which is indicated in the drawing with multiple data paths, only two of which are shown. Thus, the drawing shows the transmitter 50 including a second encoder 52b, bit interleaver 54b, selector 56b, modulator 60b, and spreader 62b. A combiner 64 is connected to the spreaders 62a, 62b for combining the spread signals, in a manner known by those of skill in the art.

The combiner 64 is connected to a chip interleaver 66 and a second selector 68. The chip interleaver 66 performs chip interleaving on the combined spread signal and provides the interleaved signal to the second selector 68. The second selector 68 selects between the combined spread signal and the chip interleaved spread signal. The selector 68 preferably is controlled by the same control signal that controls the first selector 56a, 56b such that when the first selector 56a, 56b selects the bit interleaved signal, then the second selector 68 selects the spread signal, and when the first selector 56a, 56b selects the encoded signal, then the second selector 68 selects the chip interleaved signal.

A processor 70 is connected to the second selector 68 for processing the selected one of the chip interleaved signal and the spread signal. In the presently preferred embodiment, the processor 70 performs an Inverse Discreet Fourier Transform (IDFT) on the selected signal. A multiplexer 72 is connected to the IDFT processor 70 for combining the processed signal with the control signal indicative of the current number of active code signals, to form an output signal. The output signal 72 is then transmitted over an RF channel 74.

As shown in FIGS. 2 and 3, symbol interleaving, like bit interleaving, can provide better performance than chip interleaving if the number of active codes is high, such as greater than about half of the spreading factor. Accordingly, referring again to FIG. 4, in an alternate embodiment, the transmitter 50 may include a symbol interleaver 76a connected to the modulator 60a, and a symbol interleave selector 78a connected to the spreader 62a and for selectively providing one of the modulated signal and the symbol interleaved signal to the spreader 62a. If the transmitter 50 includes the symbol interleaver 76a and the symbol interleave selector 78a, then preferably, it does not include the bit interleaver 54a and the first selector 56a, as the transmitter 50 would select between symbol interleaving and chip interleaving. The control signal from the control section 58 is used to control the symbol interleave selector 78a. Also, as previously discussed, for handling multiple active codes, the transmitter 50 includes parallel data paths, so FIG. 4 shows additional symbol interleaver 76b and symbol interleave selector 78b.

In addition to providing the above transmitter 50, the present invention also provides a method of transmitting coded data information. The preferred method selects between bit and chip interleaving an active code signal, as discussed above. Alternatively, the present invention provides a method of transmitting coded data information that selects between symbol and chip interleaving the active code signal. As discussed above, chip interleaving is selected when the number of active codes is less than about half of the spreading factor and the other type of interleaving, either bit or symbol, is selected when the number of active codes is greater than about half of the spreading factor.

Referring again to FIG. 4, the method of transmitting coded data information includes the steps of receiving at least one active code signal and encoding the at least one received active code signal with the encoder 52a. Next, the encoded signal(s) is bit interleaved if the number of active code signals is greater than or equal to a predetermined value. It will be understood by those of skill in the art that the transmitter 50 and the method may either always perform the bit interleaving on the encoded signal and then either select or not select the interleaved signal or the transmitter could disable the bit interleaver and not perform bit interleaving when the number of active code signals is less than the predetermined value. Then, a selected one of the bit interleaved signals and the encoded signals is modulated and spread, and then the spread signals are combined to form a composite signal. The composite signal is chip interleaved if bit interleaving was not previously selected, in accordance with the number of active code signals. One of either the composite signal and the chip interleaved signal is processed by performing an IDFT on the signal and finally, prior to transmitting the signal over an RF channel, the processed signal is combined with the control signal so that a receiver will know which type of interleaving has been performed. Thus, the transmitted signal includes a coded information signal part and a control signal part that indicates a number of active code signals that have been combined to form the coded information signal part.

Figure 5:
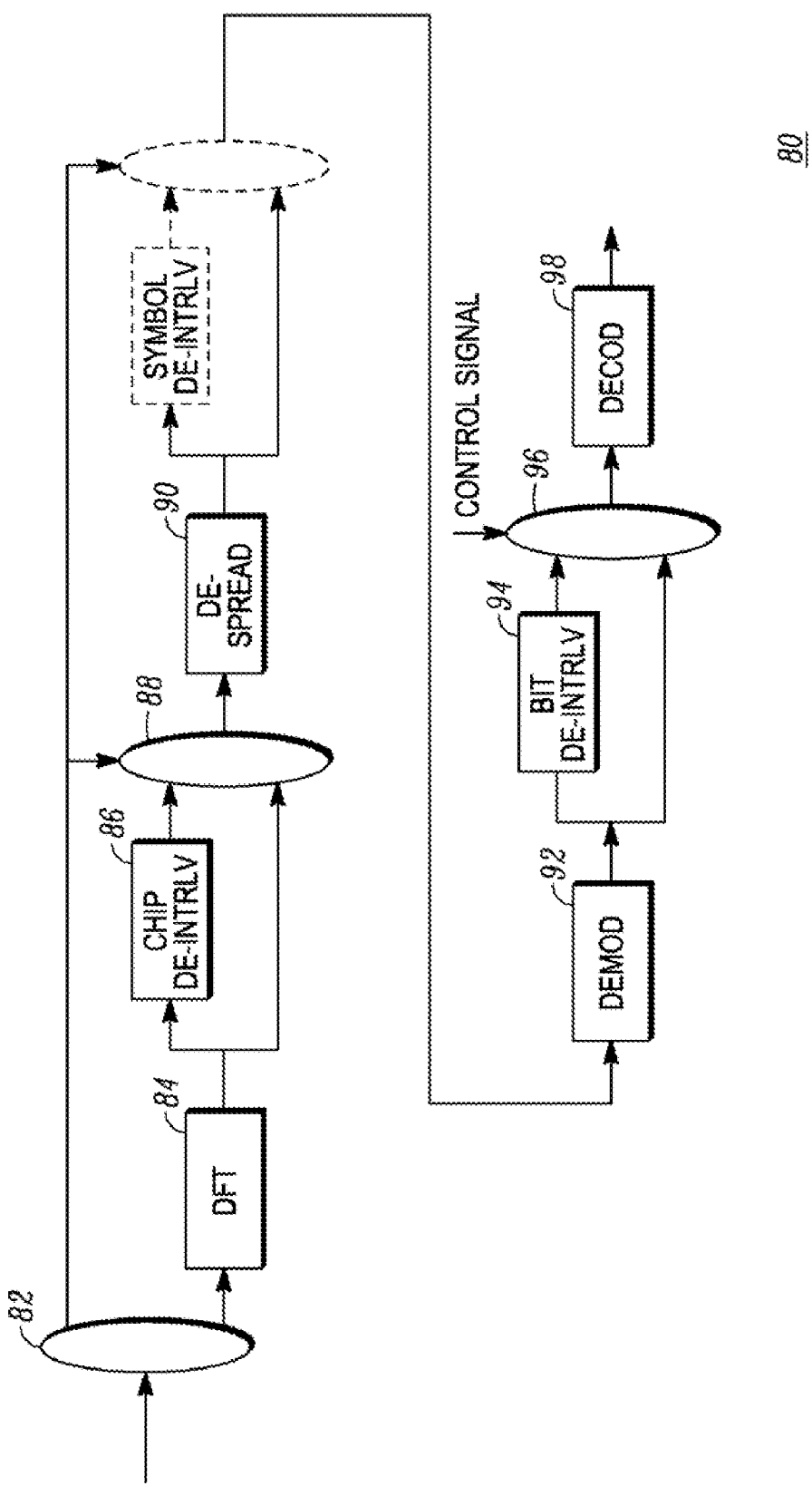
FIG. 5 is a schematic block diagram of a receiver of a radio communication system in accordance with an embodiment of the present invention.

Referring now to FIG. 5, a schematic block diagram of a receiver 80 that receives and processes the RF signal transmitted over the RF channel by the transmitter 50 is shown. The receiver 80 includes a demultiplexer 82 for separating the RF signal into a coded information signal and a control signal. A processor 84 is connected to the demultiplexer 82 for receiving the coded information signal and performing a DFT on the coded information signal to generate a processed signal. A chip de-interleaver 86 is connected to the processor 84 for receiving the processed signal and performing chip de-interleaving on the processed signal to generate a chip de-interleaved signal. A first or chip de-interleave selector 88 is connected to the chip de-interleaver 86 and the processor 84 for selecting one of the chip de-interleaved signal and the processed signal. The chip de-interleave selector 88 is controlled by the control signal received from the demultiplexer 82. The control signal indicates the type of interleaving that was performed on the transmitted RF signal by the transmitter 50.

A de-spreader 90 is connected to the chip de-interleave selector 88 for receiving and de-spreading the selected signal. A demodulator 92 is connected to the de-spreader 90 for demodulating the de-spread signal. A bit de-interleaver 94 is connected to the demodulator 92 for bit de-interleaving the demodulated signal. A second or bit de-interleave selector 96 is connected to the demodulator 92 and the bit de-interleaver 94 for selecting one of the demodulated signal and the bit de-interleaved signals. The second selector 96 is controlled by the control signal received from the demultiplexer 82. As previously discussed, the control signal indicates the type of interleaving that was performed on the transmitted RF signal by the transmitter 50. If chip de-interleaving was performed and thus the chip de-interleaved signal was selected by the first selector 88, then the second selector will not select the bit de-interleaved signal, since in the preferred embodiment, only one of chip and bit interleaving is performed, based on the number of current active code signals. In the presently preferred embodiment, the first selector 88 selects the chip interleaved signal and the second selector 96 selects the demodulated signal if the control signal indicates that the current number of active code signals is less than a predetermined value (e.g., about half of the spreading factor).

A decoder 98 is connected to the second selector 96 for decoding the signal received from the second selector to generate an active code signal. The active code signal is at least one of coded voice information and packet data. As is known by those of skill in the art, the receiver 80 may be able to process more than one spread signal, in which case a separator (not shown) is connected between the first selector 88 and the despreader 90 for separating the selected signal into multiple spread signals using different spreading codes. Alternatively, the separator selects or identifies a spread signal that is directed to the receiver 50 from amongst multiple spread signals and then process only the identified spread signal.

The adaptive interleaving of the present invention decreases required Signal to Noise ratio. Therefore, for fixed transmitting power, the cell capacity or number of active users in a cell can be increased. Further, a decrease in the Signal to Noise ratio allows for a decrease in transmitting power for a fixed number of active users in a cell. Such a decrease in transmitting power decreases inter-cell interference, which allows the cell capacity of other cells to be increased. The system continuously/dynamically adjusts operation of the receiver 80 and transmitter 50. The predetermined value of the system can be set based on the average signal quality, S/N, and BER (or SER) measured during operational testing of the system in the field or under expected operational conditions. The system may constantly monitor the received signal quality, S/N, the speech objective quality measure, and BER (or SER) and respond to changing conditions by way of changing the method of interleaving. If the channel statistics have been determined to have changed significantly enough, the predetermined value can be updated.

The description of the preferred embodiments of the present invention have been presented for purposes of illustration and description, but are not intended to be exhaustive or to limit the invention to the forms disclosed. Although the invention is described in terms of separate processing components, it will be understood by those of skill in the art the that invention may be implemented in hardware, software, or a combination of hardware and software. Thus, changes could be made to the embodiments described above without departing from the broad inventive concept thereof. It is understood, therefore, that this invention is not limited to the particular embodiments disclosed, but covers modifications within the spirit and scope of the present invention as defined by the appended claims.

The invention claimed is:

1. A method of transmitting coded data information, comprising the steps of:
   receiving at least one active code signal;
   determining the number of received active code signals;
   encoding the at least one received active code signal;
   bit interleaving the encoded signals if the number of active code signals is greater than or equal to a predetermined value;
   modulating a selected one of the bit interleaved signals and the encoded signals;
   spreading each of the modulated signals;
   combining the spread signals to form a composite signal;
   chip interleaving the composite signal if the number of active code signals is less than the predetermined value;
   processing a selected one of the composite signal and the chip interleaved signal to form an output signal; and
   transmitting the output signal.

2. The method of claim 1, wherein the active code signals comprise at least one of coded voice information and packet data.

3. The method of claim 1, wherein the encoding step comprises FEC encoding the received active code signals.

4. The method of claim 1, wherein the processing step comprises performing an IDFT on the selected one of the composite signal and the chip interleaved signal and combining the IDFT signal with a control signal indicative of the number of active code signals to form the output signal.

5. The method of claim 1 wherein the predetermined value is about half of a maximum possible number of active code signals.

6. A method of transmitting coded data information, comprising the steps of:
   receiving at least one active code signal;
   determining the number of received active code signals;
   encoding the at least one received active code signal;
   modulating each of the encoded signals;
   symbol interleaving each of the modulated signals if the number of active code signals is greater than or equal to a predetermined value;
   spreading a selected one of the modulated signals and the symbol interleaved signals;
   combining the spread signals to form a composite signal;
   chip interleaving the composite signal if the number of active code signals is less than the predetermined value;
   processing a selected one of the composite signal and the chip interleaved signal to form an output signal;
   transmitting the output signal.

7. The method of claim 6, wherein the processing step comprises performing an IDFT on the selected one of the composite signal and the chip interleaved signal and combining the IDFT processed signal with a control signal indicative of the number of active code signals to form the output signal.

8. A method of transmitting coded data information, comprising the steps of:
   receiving at least one active code signal;
   determining the number of received active code signals;
   encoding each of the received active code signals;
   bit interleaving each of the encoded signals;
   modulating a selected one of the bit interleaved signals and the encoded signals, wherein if the number of active code signals is greater than or equal to a predetermined value, the bit interleaved signals are selected;
   spreading each of the modulated signals;
   combining the spread signals to form a composite signal;
   chip interleaving the composite signal;
   processing a selected one of the composite signal and the chip interleaved signal, wherein if the number of active code signals is less than the predetermined value, the chip interleaved signal is selected; and
   transmitting the output signal.

9. The method of claim 8, wherein the predetermined value is about half of a maximum possible number of active code signals.

10. The method of claim 8, wherein the processing step comprises performing an IDFT on the selected one of the composite signal and the chip interleaved signal and combining the IDFT processed signal with a control signal indicative of the number of active code signals to form the output signal.

11. A method of processing an RF signal comprising the steps of:
receiving at least one RF signal;
processing a coded information signal part of the at least one RF signal by performing a DFT on the coded information signal part;
performing chip de-interleaving on the processed signal to generate a chip-deinterleaved signal;
de-spreading a selected one of the chip de-interleaved signal and the processed signal, wherein the selection is based on a value of a control signal;
demodulating the selected one of the chip de-interleaved signal and the processed signal;
bit de-interleaving the demodulated signal; and
decoding a selected one of the demodulated signal and the bit de-interleaved signal to generate an active code signal, wherein the selection is based on a value of the control signal.

12. The processing method of claim 11, further comprising the step of analyzing the RF signal to determine the coded information signal part and a control signal part, and wherein the control signal is determined from the control signal part.

13. A method of processing an RF signal comprising the steps of:
receiving at least one RF signal;
processing a coded information signal part of the RF signal by performing a DFT on the coded information signal part;
performing chip de-interleaving on the processed signal to generate a chip-deinterleaved signal;
de-spreading a selected one of the chip de-interleaved signal and the processed signal, wherein the selection is based on a value of a control signal;
performing symbol de-interleaving on the de-spread signal to generate a symbol de-interleaved signal;
demodulating a selected one of the de-spread signal and the symbol de-interleaved signal, wherein the selection is based on the value of the control signal; and
decoding the demodulated signal to generate an active code signal.

14. The method of processing an RF signal of claim 13, further comprising the step of:
analyzing the RF signal to determine the coded information signal part and a control signal part, wherein the control signal is determined from the control signal part.

15. A transmitter for transmitting coded data information, comprising:
an encoder for encoding an active code signal to generate an encoded signal;
a bit interleaver connected to the encoder for performing bit interleaving on the encoded signal to generate a bit interleaved signal;
a first selector connected to the bit interleaver and the encoder for selecting one of the bit interleaved signal and the encoded signal;
a modulator connected to the first selector for receiving and modulating the selected one of the bit interleaved signal and the encoded signal;
a spreader connected to the modulator for spreading the modulated signal;
a chip interleaver connected to the spreader for performing chip interleaving on the spread signal to generate a chip interleaved signal;
a second selector connected to the chip interleaver and the spreader for selecting between one of the chip interleaved signal and the spread signal; and
a processor connected to the second selector for processing the selected one of the chip interleaved signal and the spread signal.

16. The transmitter of claim 15, wherein the first and second selectors are controlled by the control signal.

17. The transmitter of claim 16, wherein the first selector selects the bit interleaved signal and the second selector selects the spread signal if the control signal indicates that the current number of active code signals is greater than a predetermined value.

18. The transmitter of claim 16, wherein the predetermined value is about half of a maximum possible number of active code signals.

19. The transmitter of claim 16, wherein the encoder performs FEC encoding on the received active code signals.

20. The transmitter of claim 16, wherein the processor performs an IDFT on the selected one of the chip interleaved signal and the spread signal, and the transmitter further comprises a multiplexer connected to the processor for combining the IDFT signal with a control signal indicative of the number of active code signals to form an output signal.

21. A receiver that receives and processes an RF signal, the receiver comprising:
a processor connected to the demultiplexer for receiving the coded information signal and performing a DFT on the coded information signal part of the RF signal to generate a processed signal;
a chip de-interleaver connected to the processor for receiving the processed signal and performing chip de-interleaving on the processed signal to generate a chip-deinterleaved signal;
a first selector connected to the chip de-interleaver and the processor for selecting one of the chip de-interleaved signal and the processed signal;
a de-spreader connected to the first selector for receiving and de-spreading the selected signal;
a demodulator connected to the de-spreader for demodulating the de-spread signal;
a bit de-interleaver connected to the demodulator for bit de-interleaving the demodulated signal;
a second selector connected to the demodulator and the bit de-interleaver for selecting one of the demodulated signal and the bit de-interleaved signals; and
a decoder connected to the second selector for decoding the signal received from the second selector to generate an active code signal.

22. The receiver of claim 21, wherein the first selector selects the chip interleaved signal and the second selector selects the demodulated signal if a control signal indicates that the current number of active code signals is less than a predetermined value.

23. The receiver of claim 21, further comprising a demultiplexer for separating the RF signal into the coded information signal part and the control signal.

* * * * *